United States Patent [19]

Hallgren

[11] Patent Number: 4,539,379

[45] Date of Patent: Sep. 3, 1985

[54] METHOD FOR MAKING SILICONE-POLYESTER COPOLYMERS

[75] Inventor: John E. Hallgren, Scotia, N.Y.

[73] Assignee: General Electric Company, Schenectady, N.Y.

[21] Appl. No.: 613,945

[22] Filed: May 25, 1984

[51] Int. Cl.³ .................................... C08F 283/02
[52] U.S. Cl. ................................ 525/446; 525/474
[58] Field of Search .......................... 525/446, 474

[56] References Cited

U.S. PATENT DOCUMENTS

| | | | |
|---|---|---|---|
| 3,701,815 | 10/1972 | Matzner et al. ................ | 525/446 |
| 4,273,694 | 6/1981 | Pepe et al. ..................... | 525/446 |
| 4,340,520 | 7/1982 | Marsden et al. ............... | 525/446 |
| 4,348,510 | 9/1982 | Keck et al. ..................... | 525/446 |
| 4,368,294 | 1/1983 | Deubzer et al. ............... | 525/446 |
| 4,429,082 | 1/1984 | Lee et al. ....................... | 525/446 |

*Primary Examiner*—Lester L. Lee
*Attorney, Agent, or Firm*—William A. Teoli; James C. Davis, Jr.; James Magee

[57] ABSTRACT

A method is provided for making silicone-polyester block polymers comprising effecting reaction between an aminoalkylpolydiorganosiloxane and a polyester, such as a polyalkyleneterephthalate, under reduced pressure and under molten conditions.

6 Claims, No Drawings

METHOD FOR MAKING SILICONE-POLYESTER COPOLYMERS

BACKGROUND OF THE INVENTION

The present invention relates to silicon-polyester block copolymers which are made by effecting reaction between a polydiorganosiloxane having terminal aminoorganosiloxy units and a thermoplastic polyester in the molten state, while the resulting mixture is stirred under reduced pressure.

The present invention is based on the discovery that an aminoorgano terminated polydiorganosiloxane having the formula,

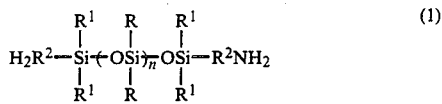

can be contacted with molten, high molecular weight polyester, such as polyalkylene terephthalate or poly(methylmethacrylate) to produce a silicone-polyester block copolymer providing a wide range of thermoplastics, elastomers and thermosets, where R is selected from $C_{(1-13)}$ monovalent hydrocarbon radicals and substituted $C_{(1-13)}$ monovalent hydrocarbon radicals, $R^1$ is selected from R radicals and $C_{(1-8)}$ alkoxy radicals, $R^2$ is a $C_{(2-13)}$ divalent organo radical and n is an integer equal to from 5 to about 2000 inclusive. The silicone-polyester copolymers made in accordance with the invention can be used as thermoplastics, molding compounds, elastomers, impact modifiers, adhesion promoters, plastic additives, and adhesives.

STATEMENT OF THE INVENTION

There is provided by the present invention, a method which comprises, agitating under reduced pressure, a mixture of aminoalkyl chain-stopped polydiorganosiloxane and a molten thermoplastic polyester to produce a silicone-polyester copolymer.

Radicals included by R of formula (1) and $C_{(1-8)}$ alkyl radicals such as methyl, ethyl, propyl, butyl, pentyl, etc.; alkenyl radicals such as vinyl, allyl, substituted alkyl radicals, for example, trifluoropropyl, cyanoethyl, etc.; aryl radicals and halogenated aryl radials such as phenyl, chlorophenyl, xylyl, naphthyl, etc. Radicals included within $R^1$ of formula (1) are, for example, the aforementioned R radicals and $C_{(1-8)}$ alkoxy radicals such as methoxy, ethoxy, propoxy, and butoxy. Radicals included by $R^2$ of formula (1) are, for example, alkylene radicals such as dimethylene, trimethylene, tetramethylene, pentamethylene; arylene radicals such as phenylene; alkaryl radicals such as ethylphenylene, etc.

A preferred procedure for making the aminorgano terminated polydiorganosiloxanes of formula (1) are by effecting reaction between a silanol terminated polydiorganosiloxane having the formula,

and an alkoxy organoaminosilane of the formula,

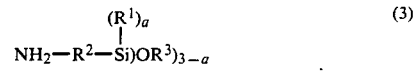

where R, $R^1$, $R^2$ and n are as previously defined, $R^3$ is a $C_{(1-8)}$ alkyl radical and is a whole number equal to 0 to 2 inclusive.

Some of the alkoxyalkylaminosilanes included within formula (3) are, for example,
$(C_2H_5)_3SiCH_2CH_2CH_2NH_2$;
$(C_2H_5)_3SiCH_2CH_2CH_2CH_2NH_2$;
$(CH_3O)_3SiCH_2CH_2CH_2HN_2$;
$CH_3O(CH_3)_2SiCH_2CH_2CH_2NH_2$;
$(CH_3O)_2CH_3SiCH_2CH_2CH_2CH_2NH_2$;

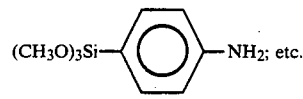

Among the preferred polyesters which can be utilized in the practice of the present invention, there are included polybutylene terephthalate and polyethylene terephthalate.

The polyesters are typically prepared by the reaction of at least one alkanediol of the formula $HO—R^4—OH$ with at least one dicarboxylic acid of the formula $HOOC—R^5—COOH$ or alkyl ester thereof, where $R^4$ is a saturated divalent aliphatic or alicyclic hydrocarbon radical containing about 2-10 and usually about 2-6 carbon atoms and $R^5$ is a divalent aliphatic radical containing about 2-20 carbon atoms or a divalent aromatic radical containing about 6-20 carbon atoms.

The term "alkyl dicarboxylic" as used herein refers to the dialkyl ester. The dicarboxylic acid may be an aliphatic acid such as succinic, glutaric, adipic, sebacic, azelaic or suberic acid, or an aromatic acid such as isophthalic or terephthalic acid. The aromatic acids, especially terephthalic acid, are preferred. The use of an ester and especially a lower alkyl ester is preferred, the term "lower alkyl" denoting alkyl groups having up to 7 carbon atoms; it is most often a methyl, ethyl or butyl ester. The reaction is ordinarily catalyzed by a titanium compound, frequently a tetraalkyl titanate. Suitable titanates include, for example, tetraisopropyl titanate and tetra(2-ethylhexyl)titanate.

Further suitable reagents for forming polyesters, and titanium compounds useful as catalysts therefor, are described in the following U.S. Pat. Nos. 2,465,319, 2,720,520, 2,727,881, 2,822,348, 3,047,539.

The disclosures of these patents are incorporated by reference herein.

For the preparation of the polyester, the dicarboxylic acid or ester thereof, alkanediol and titanium-containing catalyst are typically heated in the range of about 180°-300° C. for a period of time sufficient to produce the desired polyester. The mole ratio of diol to acid or ester is typically from about 1:1 to about 1.4:1 and preferably from about 1.2:1 to about 1.3:1, the excess diol being useful to drive the reaction to completion. The amount of titanium-containing catalyst used is typically about 0.005-0.2 percent by weight, based on the amount of acid or ester.

The polyesters used according to this invention normally have number average molecular weights in the range of about 20,000-50,000.

A preferred procedure for making the aminoorganopolydiorganosiloxanes of formula (1) is to effect reaction in an inert atmosphere between the silanol terminated polydiorganosiloxane and the alkoxyaminoorganosilane of formula (2) at temperatures in the range of from 0° C. to 150° C. It has been found that reaction can be facilitated by use of 0.01 to 0.1 parts of an acid catalyst such as acetic acid. However, the use of an acid catalyst in the synthesis of the aminoorganopolydiorganosiloxane using a silanol terminated polydiorganosiloxane is optional. There can be utilized sufficient aminoalkylalkoxysilane to provide from about 0.5 to 2.0 moles of amino radicals per mole of silanol radicals of the silanol terminated polydiorganosilxoane to provide for effective results.

The silicone-polyester copolymers of the present invention can be made by effecting contact between the aminoorgano terminated polydiorganosiloxane and the polyester in the molten state and in the substantial absence of an organic solvent. One procedure, for example, is to mix the aminoorgano terminated polydiorganosiloxane and the thermoplastic polyester which can be in pelletized form at ambient temperatures and thereafter heat the resulting mixture to a temperature sufficient to melt the thermoplastic polyester. Temperatures in the range of from about 200° C. to 350° C. have been found to be effective.

Depending upon the properties desired in the silicone-polyester copolymer which can vary from a thermoplastic, a thermoset or an elastomer, the weight proportions of the silicone to the polyester can vary widely. For example, it has been found that a mixture from about 70 to 90% by weight of silicone and from about 10 to 30% by weight of polyester will provide for a silicon-polyester copolymer having elastomeric properties. Considerable variations in tensile psi and elongation percent, of course, will vary depending upon the block size of the polydiorganosiloxane and the nature of the R radicals attached to a silicon. The silicone-polyester copolymer will exhibit thermoplastic properties having up to about 30% by weight of polydiorganosiloxane, while a slight degree of cross-linking has been found in silicone-polyester copolymers having from about 40-60% by weight of silicone, based on the weight of the silicone-polyester copolymer.

The preferred silicone-polyester copolymers of the present invention are characterized by having the silicone block and the polyester block joined together by the following siloxy organo amide linkage,

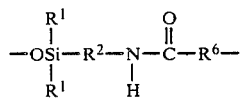  (4)

where $R^1$ and $R^2$ are as previously defined and $R^6$ is a $C_{(6-13)}$ divalent aromatic hydrocarbon radical.

In order that those skilled in the art will be better able to practice the present invention, the following examples are given by way of illustration and not by way of limitation. All parts are by weight.

EXAMPLE 1

A mixture of 105 grams of silanol terminated polydimethylsiloxane fluid having a molecular weight of about 41,300, 1.18 gram of γ-aminopropyltriethoxysilane, 0.32 gram of dihexylamine and 0.03 gram of acetic acid was stirred at 80° C. for two hours under a nitrogen atmosphere. There was obtained a polydimethylsiloxane having terminal aminopropyldiethoxysiloxy end groups. The identity of the product was further confirmed by Si-29NMR analysis.

A mixture of 5 grams of the above aminopropyldiethoxysiloxxy terminated polydimethylsiloxane and 5 parts of a polybutyleneterephthalate and 5 parts of pellitized polybutyleneterephthalate having a molecular weight of about 25,000, were heated at a temperature of 290° C. with stirring for 1 hour under vacuum. The mixture was then allowed to cool to room temperature. There was obtained a white opaque silicone-polybutyleneterephthalate copolymer. The silicone-polybutyleneterephthalate copolymer was an elastomer which could be extruded onto a wire and useful as an insulating material for a metallic conductor, such as a copper wire.

Additional silicone-polybutyleneterephthalate copolymers were prepared following the above procedure utilizing a variety of mixtures containing from 10 to 90% by weight of the polydimethylsiloxane and from 90 to 10% by weight of the polybutyleneterephthalate. There was obtained a series of thermoplastic materials having from about 10 to about 30% by weight of silicone, a series of thermoset materials having from about 40 to 60% by weight of silicone and a series of elastomers having from about 70-90% by weight of silicone. All of the silicone-polyester materials made by the aforementioned procedures were characterized by having the following chemically combined connecting unit between the silicone block and the polybutyleneterephthalate block.

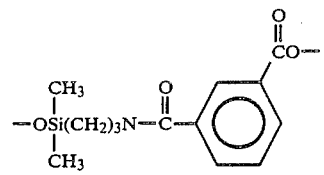

Although the above example is directed to only a few of the very many variables which can be utilized in the practice of the method of the present invention, it should be understood that the present invention is directed to a much broader variety of silicone-polyester copolymers which can be made by effecting reaction between the polydiorganosiloxane included within formula (1) and a thermoplastic polyester described in the specification preceding the example.

What I claim as new and desire to secure by Letters Patent of the United States is:

1. A method which comprises, agitating under reduced pressure at a temperature of 200° C. to 350° C. in the substantial absence of an organic solvent, a mixture of aminoalkyl chain-stopped polydiorganosiloxane and a molten thermoplastic polyester to produce a silicone-polyester copolymer having a silicone block and a polyester block joined together by a siloxy organoamide linkage having the formula

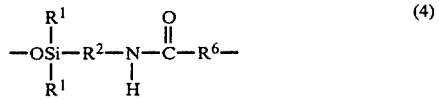

where $R^1$ is selected from $C_{(1-13)}$ monovalent hydrocarbon radicals, substituted $C_{(1-13)}$ monovalent hydrocarbon radicals and $C_{(1-8)}$ alkoxy radicals, $R^2$ is a $C_{(2-13)}$ divalent organo radical and $R^6$ is a $C_{(6-13)}$ divalent aromatic hydrocarbon radical.

2. A method in accordance with claim 1, where the amino alkyl terminated polydiorganosiloxane is an amino alkyl terminated polydimethylsiloxane.

3. A method in accordance with claim 1, where the thermoplastic polyester is a polybutyleneterephthalate.

4. A method in accordance with claim 1, where the silicone-polyester copolymer is an injection moldable thermoplastic.

5. A method in accordance with claim 1, where the silicone-polyester copolymer is an elastomer.

6. A method in accordance with claim 1, where the amino alkyl terminated polydiorganosiloxane is a γ-aminopropyl ethoxy terminated polydiorganosiloxane.

* * * * *